June 10, 1930.  E. B. GUTHMANN ET AL  1,762,224
GRAVITY FLOW VISIBLE FILTER
Filed Nov. 5, 1928

INVENTORS.
Daniel C. Corbett
Edward B. Guthmann.
BY
ATTORNEY.

Patented June 10, 1930

1,762,224

UNITED STATES PATENT OFFICE

EDWARD B. GUTHMANN, OF WARREN, AND DANIEL CHARLES CORBETT, OF BISBEE, ARIZONA

GRAVITY-FLOW VISIBLE FILTER

Application filed November 5, 1928. Serial No. 317,370.

Our invention relates to filtering devices, and more particularly to those devices especially adapted to filter the lighter oils, such as kerosene, naphtha, gasoline and the like, the filtering being done in such a manner that the velocity of the fluid inflow and discharge therefrom will be substantially equal, the flow of the fluid being induced either by pressure or gravity head, said devices being preferably transparent so that the impurities contained in said fluid will at all times be visible.

It accordingly is an object of our invention to provide a novel form of filtering device equipped with a cap or cover plate having therein fluid inlet and outlet passages, with which cap plate is associated, and sealed therewith, a container, preferably of transparent material, such as glass, a protector, preferably of reticulated material being detachably associated with said container, which container is equipped with any desired form of drain means, so that the impurities in the fluid will at all times be visible and capable of being drained off from time to time, our primary purpose being to apply the same to gasoline filling containers, affording the customer visible filtration of the gasolene he is buying.

It is also within the province of our invention to equip the framework of the filtering element with a re-entrant portion, also enveloped with flat filtering material of any desired kind, said re-entrant portion being also equipped with a support for supporting a drain means associated with the container in which said filtering element is positioned.

It is also an object of our invention to provide a novel form of filtering device which is simple in character, easy and inexpensive to manufacture, thoroughly effective and efficient in operation, composed of a minimum number of parts, and one which will thoroughly and reliably effect the objects intended.

Further objects and advantages of our invention will become more apparent as the description thereof proceeds.

Figure 1:
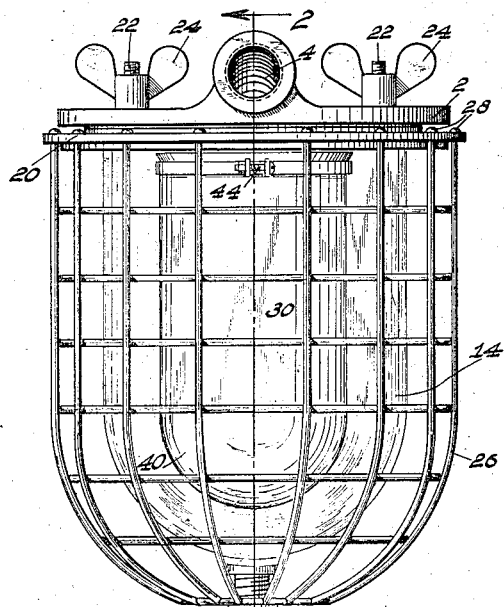
Figure 2:
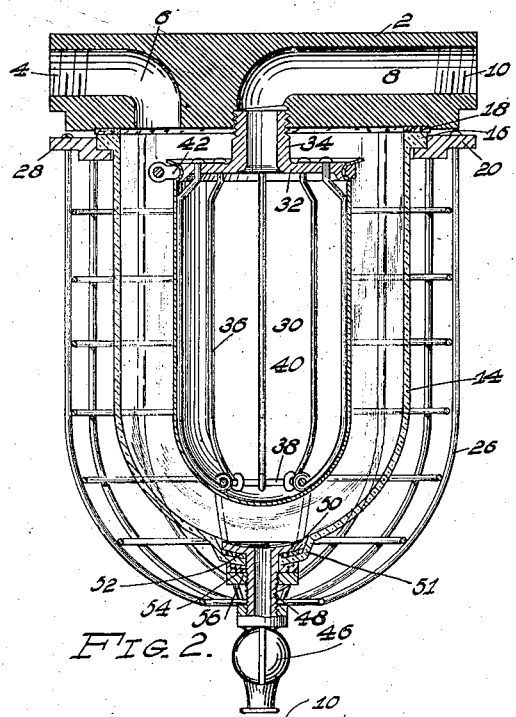
Figure 5:
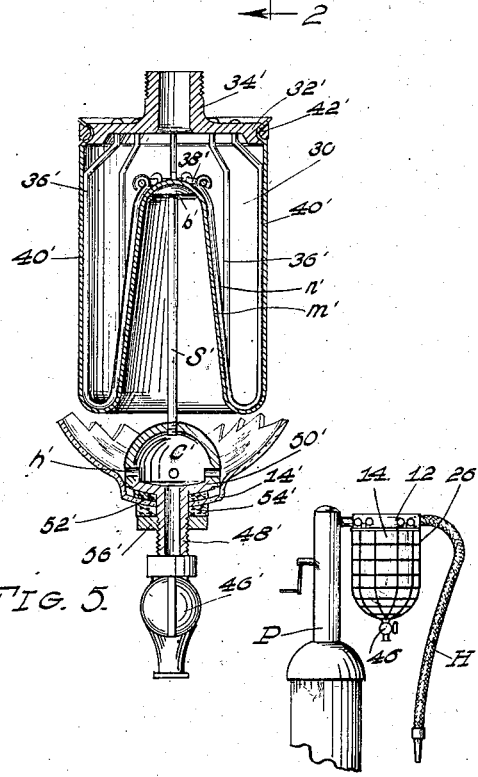
Figure 3:
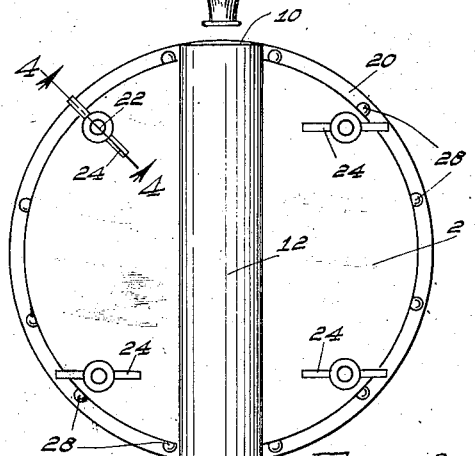

Reference is had to the accompanying drawings, in which similar reference characters denote similar parts. In the drawings, Fig. 1 is a side elevational view of our invention, Fig. 2 is a cross-sectional view on the line 2—2, Fig. 1, looking in the direction of the arrows, Fig. 3 is a top plan view of Fig. 1, Fig. 4 is a fragmentary cross-sectional detail view on an enlarged scale on the line 4—4, Fig. 3, looking in the direction of the arrows, Fig. 5 is a vertical sectional view of an alternative form of filter element, and Fig. 6 is a fragmentary elevational view showing an application of our invention.

Figures 4, 6:
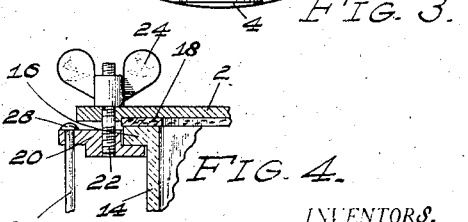

Describing our invention more in detail, it is possible to associate our improved device with liquid motor fuel dispensing devices or metered pumps, such as indicated at P, Fig. 6, equipped with an outlet hose 4, containers on delivery trucks, for the filtration of such liquid motor fuels, out of which containers, dispensing devices or pumps, such fuels are for sale, or said device may be used anywhere it is a desideratum to provide for an effective and thorough filtration, where visibility is especially desired, the device operating equally well under pressure conditions or a head due to gravity.

Our improved device comprises a cap or cover plate 2, preferably of circular form and equipped with an inlet 4 leading to an inlet passage 6, preferably shaped as shown, and an outlet or discharge passage 8, shaped as shown, and leading to a fluid outlet 10, said passages being preferably positioned in a raised portion 12 associated in any desired manner with the cap plate 2, said plate being constructed of any preferred material and in any manner in practice found desirable.

To the cap or cover plate 2, and preferably depending therefrom, is a container of transparent material, such as glass, said container being equipped with a flange 16, between which and the plate 2 is positioned a sealing washer or gasket 18 of any desired material to provide a fluid seal, an annular member or flange 20, preferably shaped as shown, being provided to hold the container 14 in position, the cap 2 being recessed in the bottom, as shown, to receive said gasket or washer.

As seen more particularly in Figs. 1, 3 and 4, the annular member 20 is preferably supported by the plate 2 by means of bolts or other devices 22, screwed into the member 20, which bolts are equipped with wing nuts or other securing devices 24, so that the container 14 may readily and easily be detached from the plate 2 when desired.

The member 20 is also used for supporting the protective member or protector 26, which protector is of reticulated form, being preferably constructed of wires or other elements for effectively preventing the container 14 from injury or breakage. The elements forming the protector 26 may be held in place on the member 20, by passing the wires or other devices through holes in said member, said devices being headed as indicated at 28. Of course any other form of protecting means may be substituted for that shown and described, and still remain within the province of our invention.

Positioned inside the container 14, and preferably detachably associated with the outlet passage 8, is the filtering element, designated generally by the reference numeral 30, said element comprising a base 32 equipped with a screw-threaded fluid outlet portion 34 for screwing said element into the passage 8. Depending from the base 32 is a frame work 36, preferably composed of a set of headed wires, bent as shown, and secured in any preferred manner to the lower circular portion 38, the upper headed portions passing through holes in the base 32, the upper ends of the wires being bent as shown for convenience in assembly. Of course, this specific form of frame work is suggestive merely, and may in practice be changed as desired.

The frame work 30 serves the purpose of holding the filtering material 40 in expanded position, said material, which may for example be of chamois skin or the like, enveloping said frame work. The base 32 is preferably grooved as depicted in Fig. 2, for the reception of the material 40, a clamping ring 42, equipped with any desired form of locking device, such as the screw clamp 44, being used to hold the filtering material securely on the frame work and providing for its ready removal and replacement. While this construction forms an admirable filtering medium, it will be clear that any other preferred construction may in practice be substituted therefor.

Any preferred means for draining the container 14, to drain off the sediment, water and the like, may be provided, that shown comprising a pet cock 46, positioned at any point desired, but preferably in the lower portion of said container, the screw-threaded neck 48 of which may be provided with a flange 50, preferably curved as shown, and positioned in a depression 52 in the container 14 so that it will be flush with the bottom thereof, making it possible to drain the last drop, an inside packing member of felt, cork or the like being positioned between said flange and the bottom of said depression, and another similar washer 54 being positioned on the neck 48 and externally of the container 14, a nut 56 functioning to hold the assembly securely in position.

The fluid to be filtered entering the passage 6 through the inlet 4, flows into the container 14, and, passing through the material 40, which is of a predetermined porosity, is discharged through the nipple 34 into the discharge passage 8 and finally out the outlet 10, said inlet and discharge passages being of such a size, and said material of such a porosity that the velocity of the inlet fluid and discharge are substantially equalized by the passage of said fluid through the container 14, which functions as an equalizing chamber, as will be obvious.

Fig. 5 shows a modified form of filtering element which provides a greater filtering surface than that previously described, said element being designated generally by 30', and comprises a base 32', grooved as in the other form of our invention, and provided with a clamping ring 42' holding the material 40' in position as before, the frame work 36' holding said material in expanded position, a screw-threaded nipple 34' being used to hold the element 30' in position on the cap plate of the container.

The element 30', as just stated is provided with a greater filtering surface by reason of the reentrant frame portion n', enveloped by the reentrant material m', said material being held at the top to the ring 38' by a base b' of any preferred shape, which base has associated therewith a support s', preferably secured to a ported housing c', the holes or ports h' providing an exit for the sediment, water or the like to the pet cock 46'. The housing c' is associated in any desired manner with the flange 50' of the screw threaded neck 48', which as before is equipped with packing washers 52' and 54', a securing nut 56' holding the assembly securely in position in the container 14'.

While we have thus described our invention with great particularity, it will be clear that the same may be modified throughout a wide range. We, accordingly do not propose to be limited to the exact details of construction shown and described, but reserve the right in practice to make any and all modifications thereof that fall within the scope of the appended claim.

We claim as our invention:

In a device of the class described, in combination, a transparent container, a cap for said container, said cap being provided with fluid inlet and outlet means, a filter suspended from said cap, said filter having a re-entrant portion and sets of means for distending said filter into cylindrical form and for distending said re-entrant portion into conical form.

In testimony whereof we have signed our names to this specification.

EDWARD B. GUTHMANN.
DANIEL CHARLES CORBETT.